(12) United States Patent
Stojkovic

(10) Patent No.: US 11,964,697 B2
(45) Date of Patent: Apr. 23, 2024

(54) BODY ON FRAME VEHICLE FRONT END STRUCTURE

(71) Applicant: Ford Global Technologies, LLC, Dearborn, MI (US)

(72) Inventor: Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/846,749

(22) Filed: Jun. 22, 2022

(65) Prior Publication Data

US 2023/0415815 A1    Dec. 28, 2023

(51) Int. Cl.
  *B62D 25/08*   (2006.01)
  *B62D 21/03*   (2006.01)
  *B62D 25/04*   (2006.01)
  *B62D 27/02*   (2006.01)
  *B62D 29/00*   (2006.01)
  *B62D 27/00*   (2006.01)

(52) U.S. Cl.
  CPC .............. *B62D 25/08* (2013.01); *B62D 21/03* (2013.01); *B62D 25/04* (2013.01); *B62D 27/023* (2013.01); *B62D 29/008* (2013.01); *B62D 27/00* (2013.01)

(58) Field of Classification Search
  CPC .... B62D 25/08; B62D 25/082; B62D 25/084; B62D 25/085; B62D 23/00; B62D 23/24; B62D 23/04; B62D 27/02; B62D 27/023
  USPC ........ 296/193.01, 193.09, 203.01, 2, 29, 30, 296/205
  See application file for complete search history.

(56) References Cited

U.S. PATENT DOCUMENTS

| | | | | |
|---|---|---|---|---|
| 1,263,543 A | * | 4/1918 | Fageol | B62D 25/105 180/69.2 |
| 3,224,805 A | * | 12/1965 | Clyatt | B60R 9/00 296/10 |
| 6,123,378 A | * | 9/2000 | Teply | B62D 27/023 296/205 |
| 6,412,857 B2 | * | 7/2002 | Jaekel | B62D 23/005 296/205 |
| 7,255,377 B2 | * | 8/2007 | Ahn | B60R 19/24 293/102 |

(Continued)

FOREIGN PATENT DOCUMENTS

| | | | | |
|---|---|---|---|---|
| CN | 206544545 U | * | 10/2017 | ............. B62D 25/08 |
| CN | 214565680 | | 11/2021 | |
| EP | 2708446 | | 4/2016 | |

(Continued)

*Primary Examiner* — Dennis H Pedder
(74) *Attorney, Agent, or Firm* — Burris Law, PLLC

(57) ABSTRACT

A body on frame vehicle includes left and right front tubes and a lower support. The left front tube extends above a left front wheel well of the body on frame vehicle and terminates in a forward direction at a left forward end. The right front tube extends above a right front wheel well of the body on frame vehicle and terminates in the forward direction at a right forward end. The lower support includes a lateral portion, left riser portion, and right riser portion. A left end of the lower support extends upward from the lateral portion to form the left riser portion and a right end of the lower support extends upward from the lateral portion to form the right riser portion. The left and right riser portions are affixed to the left and right front tube proximate the left forward end and the right forward end, respectively.

20 Claims, 6 Drawing Sheets

(56) References Cited

U.S. PATENT DOCUMENTS

| | | | |
|---|---|---|---|
| 8,720,981 B1 * | 5/2014 | Shafer | B62D 25/025 296/193.07 |
| 9,573,628 B2 | 2/2017 | Mildner et al. | |

FOREIGN PATENT DOCUMENTS

| | | | | |
|---|---|---|---|---|
| JP | 2006056394 A | * | 3/2006 | |
| JP | 2007106370 A | * | 4/2007 | |
| JP | 6218231 | | 10/2017 | |

* cited by examiner

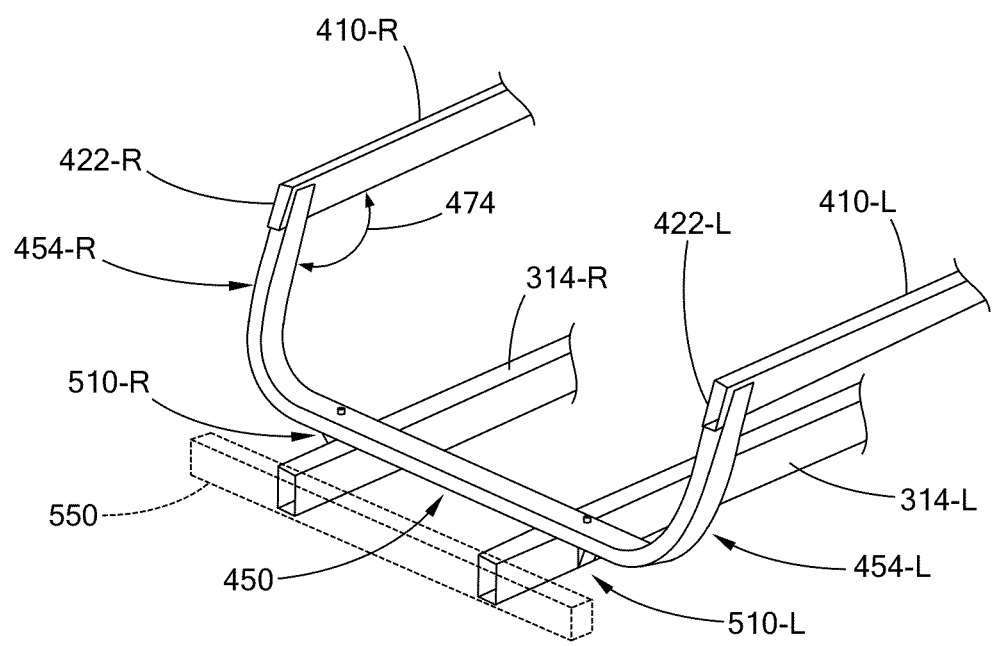
FIG. 5
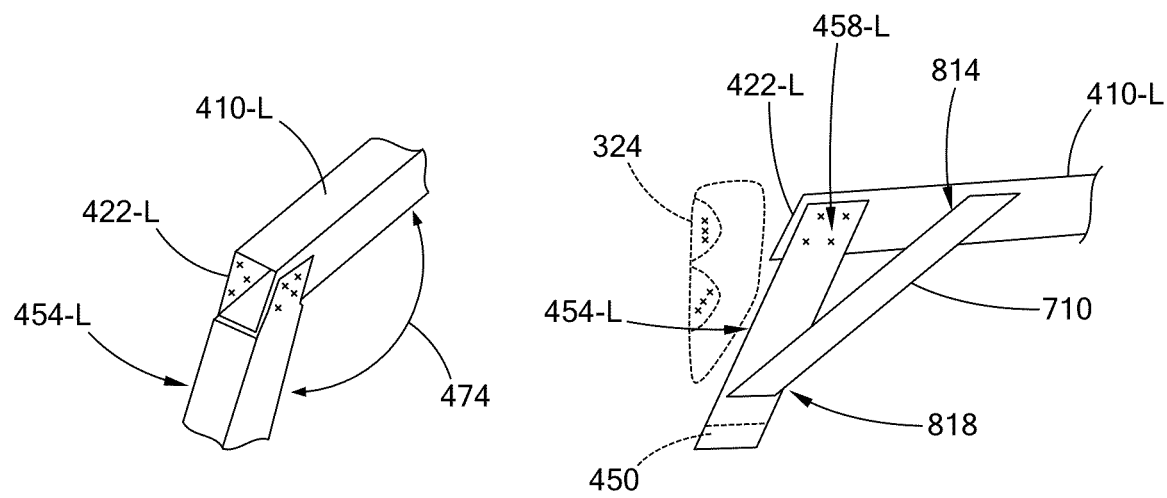
FIG. 6
FIG. 7

BODY ON FRAME VEHICLE FRONT END STRUCTURE

FIELD

The present disclosure relates to a front end structure of a body on frame vehicle.

BACKGROUND

The statements in this section merely provide background information related to the present disclosure and may not constitute prior art.

With reference to FIGS. 1 and 2, a body on frame vehicle 10 typically includes a frame 12 that includes pair of main frame rails 14-L, 14-R that extend longitudinally along the vehicle 10, substantially the full length of the vehicle 10 and are tied laterally together by structural cross-members 16. A vehicle body 18, an engine (not shown), and/or the vehicle batteries (not shown) and electric motors (not shown) in an electric or hybrid vehicle, are typically mounted to and supported by the frame 12. The wheels 22 are coupled to the frame 12 by suspension components (not shown, e.g., struts or shocks and springs) mounted to the frame 12. In some vehicles, such as the example shown in FIG. 1, a front subframe 26 includes a plurality of front structural members that generally dictate the lateral sides and forward extent of the space under the hood (not shown), also referred to as the engine compartment or the frunk, for example. These front structural members typically support other vehicle components such as body panels (e.g., body panel 30), a radiator (not shown), hood hinges (not shown), among other components.

Typically, these front structural members include a left upper tube 34-L, a right upper tube 34-R, and a lower support tie bar 38. Due to the structural strength needed, the left and right upper tubes 34-L, 34-R are typically each a single, unitary body that is hydro-formed into a complex three-dimensional shape that extends forward from a rear end (only one of which is visible in FIG. 1 and labeled as 42-L) connected to a front hinge pillar 46-L, 46-R of the body 18, then curves to angle inboard and forward before curving downward to extend downward and forward to a bottom end 50-L, 50-R. The lower support tie bar 38 is a separate unitary member having a box-shaped cross-section that extends laterally between the two bottom ends 50-L, 50-R of the left and right upper tubes 34-L, 34-R and is configured to support a radiator (not shown) and/or other components.

However, this typical front end structure can be limiting in terms of manufacturing processes, useable space under the hood, and placement of the vehicle's headlights, among other issues. For example, while hydroforming works well for current applications, the hydroforming process has minimum curvature and geometric constraints that limit the envelope of the space under the hood and the placement of headlights.

The teachings of the present disclosure address these and other issues with typical front end structures of body on frame vehicles.

SUMMARY

This section provides a general summary of the disclosure and is not a comprehensive disclosure of its full scope or all of its features.

In one form, according to the teachings of the present disclosure, a body on frame vehicle includes a left front tube, a right front tube, and a lower support. The left front tube extends proximate a left side of the body on frame vehicle above a left front wheel well of the body on frame vehicle. The left front tube terminates in a forward direction of the body on frame vehicle at a left forward end. The right front tube extends proximate a right side of the body on frame vehicle above a right front wheel well of the body on frame vehicle. The right front tube terminates in the forward direction at a right forward end. The lower support includes a lateral portion, a left riser portion, and a right riser portion. A left end of the lower support extends upward from the lateral portion to form the left riser portion and a right end of the lower support extends upward from the lateral portion to form the right riser portion. The left riser portion is affixed to the left front tube proximate the left forward end and the right riser portion is affixed to the right front tube proximate the right forward end. According to a variety of alternative configurations that may be implemented individually or in any combination thereof: the left riser portion includes a pair of left flanges that are spaced apart to define a left slot, the left front tube being received in the left slot and connected to the pair of left flanges, wherein the right riser portion includes a pair of right flanges that are spaced apart to define a right slot, the right front tube being received in the right slot and connected to the pair of right flanges; the left front tube includes a pair of left flanges that are spaced apart to define a left slot, the left riser portion being received in the left slot and connected to the pair of left flanges, wherein the right front tube includes a pair of right flanges that are spaced apart to define a right slot, the right riser portion being received in the right slot and connected to the pair of right flanges; the left portion is connected to the left front tube at a location on the left front tube that is rearward of the lateral portion and the right riser portion is connected to the right front tube a location on the right front tube that is rearward of the lateral portion; the lateral portion is forward of the left forward end of the left front tube and the lateral portion is forward of the right forward end of the right front tube; the lower support is unitary body; the left riser portion and the right riser portions are welded to the lateral portion; the left riser portion and the right riser portion are rectangular in cross-sectional shape; the left front tube and the right front tube are rectangular in cross-sectional shape; the lower support is extruded aluminum or roll-formed aluminum; the body on frame vehicle further includes a left gusset and a right gusset, wherein a forward end of the left gusset is affixed to the left riser portion between the lateral portion and the left front tube, wherein a rearward end of the left gusset is affixed to the left front tube rearward of the left riser portion, and wherein a forward end of the right gusset is affixed to the right riser portion between the lateral portion and the right front tube, wherein a rearward end of the right gusset is affixed to the right front tube rearward of the right riser portion; the body on frame vehicle further includes an upper bolster disposed above the lateral portion, wherein a left end of the upper bolster is attached to the left riser portion, the left front tube proximate the left forward end, or both the left riser portion and the left front tube proximate the left forward end, wherein a right end of the upper bolster is attached to the right riser portion, the right front tube proximate the right forward end, or both the right riser portion and the right front tube proximate the right forward end; the left end of the upper bolster is attached to the left front tube proximate the left forward end and the right end of the upper bolster is attached to the right front tube proximate the right forward end; the left end of the upper bolster is attached to the left riser portion and the right end of the upper bolster is attached to the right riser portion; a rearward end of the left front tube is attached to a left hinge pillar of the body on frame vehicle, wherein a rearward end of the right front tube is attached to a right hinge pillar of the body on frame vehicle; the body on frame vehicle further includes a left frame rail and a right frame rail, wherein the lateral portion is mounted to a forward end portion of the left frame rail, wherein the left frame rail extends rearward of a left hinge pillar of the body on frame vehicle, and wherein the lateral portion is mounted to a forward end portion of the right frame rail, wherein the right frame rail extends rearward of a right hinge pillar of the body on frame vehicle.

In another form, according to the teachings of the present disclosure, a body on frame vehicle includes a left front tube, a right front tube, a lower support, a left frame rail, and a right frame rail. The left front tube extends proximate a left side of the body on frame vehicle above a left front wheel well of the body on frame vehicle. The left front tube terminates in a forward direction of the body on frame vehicle at a left forward end. The right front tube extends proximate a right side of the body on frame vehicle above a right front wheel well of the body on frame vehicle. The right front tube terminates in the forward direction at a right forward end. The lower support includes a lateral portion, a left riser portion, and a right riser portion. A left end of the lower support extends upward from the lateral portion to form the left riser portion and a right end of the lower support extends upward from the lateral portion to form the right riser portion. The left riser portion is affixed to the left front tube proximate the left forward end and the right riser portion is affixed to the right front tube proximate the right forward end. The lateral portion is mounted to a forward end portion of the left frame rail. The left frame rail extends rearward of a left hinge pillar of the body on frame vehicle. The lateral portion is mounted to a forward end portion of the right frame rail. The right frame rail extends rearward of a right hinge pillar of the body on frame vehicle. According to a variety of alternative configurations that may be implemented individually or in any combination thereof: the left portion is connected to the left front tube at a location on the left front tube that is rearward of the lateral portion and the right riser portion is connected to the right front tube a location on the right front tube that is rearward of the lateral portion; one of the left riser portion and the left front tube includes a pair of left flanges that are spaced apart to define a left slot, and the other one of the left riser portion and the left front tube is received in the left slot and connected to the pair of left flanges, wherein one of the right riser portion and the right front tube includes a pair of right flanges that are spaced apart to define a right slot, and the other one of the right riser portion and the right front tube is received in the right slot and connected to the pair of right flanges; the body on frame vehicle further includes a left gusset and a right gusset, wherein a forward end of the left gusset is affixed to the left riser portion between the lateral portion and the left front tube, wherein a rearward end of the left gusset is affixed to the left front tube rearward of the left riser portion, and wherein a forward end of the right gusset is affixed to the right riser portion between the lateral portion and the right front tube, wherein a rearward end of the right gusset is affixed to the right front tube rearward of the right riser portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a perspective view of the front end structure and a front portion of the frame of the vehicle of FIG. 3;

FIG. 6 is perspective view of a portion of the front end structure of FIG. 3;

FIG. 7 is a side view of the portion of the front end structure of FIG. 6, illustrated with an optional gusset in accordance with the teachings of the present disclosure;

Figure 1:
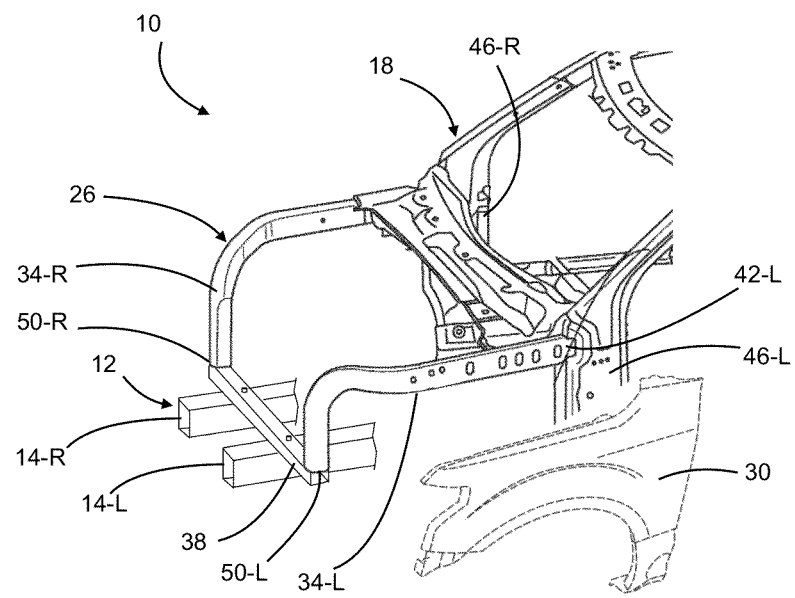
FIG. 1 is a partially exploded perspective view of a front end portion of an example body on frame vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
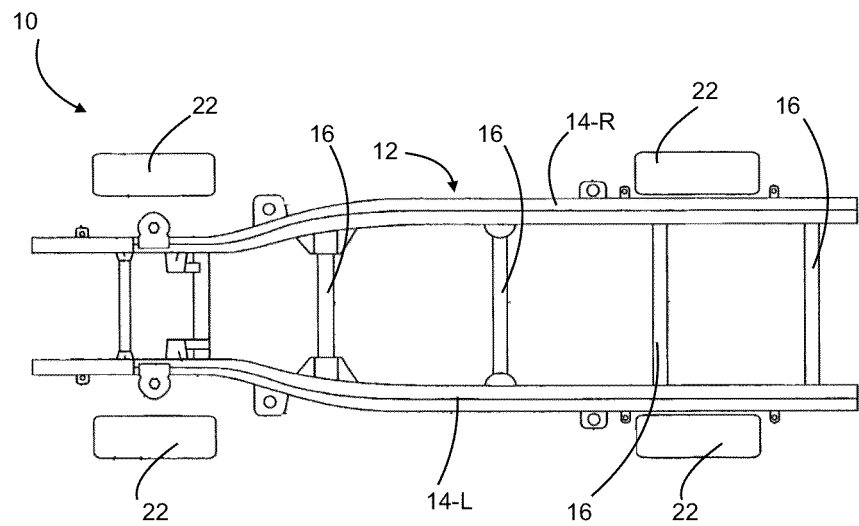
FIG. 2 is a top view of a frame of the vehicle of FIG. 1.
Figure 3:
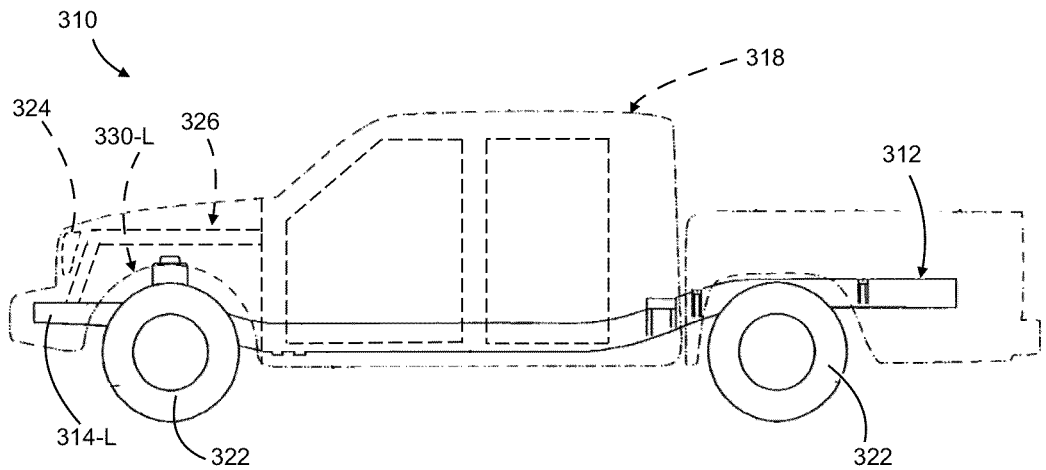
FIG. 3 is a side view of a body on frame vehicle including a frame, a body, and a front end structure in accordance with the teachings of the present disclosure.

Referring to FIG. 3, a body on frame vehicle 310 in accordance with the teachings of the present disclosure is illustrated. In the example provided, the vehicle 310 is a pickup truck, though the teachings of the present disclosure also apply to other types of vehicles, e.g., commercial vehicles, passenger cars, recreational vehicles, military vehicles, and autonomous vehicles. The vehicle 310 includes a frame 312 and a body 318. The frame 312 and body 318 can be substantially similar to the frame 12 and body 18 of the vehicle of FIGS. 1 and 2, except as otherwise shown or described herein. The frame 312 includes a left main frame rail 314-L, a right main frame rail 314-R (FIG. 5) and a plurality of cross-members (not specifically shown but similar to cross-members 16 shown in FIG. 2). The frame 312 is supported relative to wheels 322 via suspension components (not specifically shown). The vehicle 310 also includes a front subframe 326. The vehicle may include headlights 324 (one of which is schematically shown in FIGS. 3 and 7) mounted to the body 318 and/or the front subframe 326.

Figure 4:
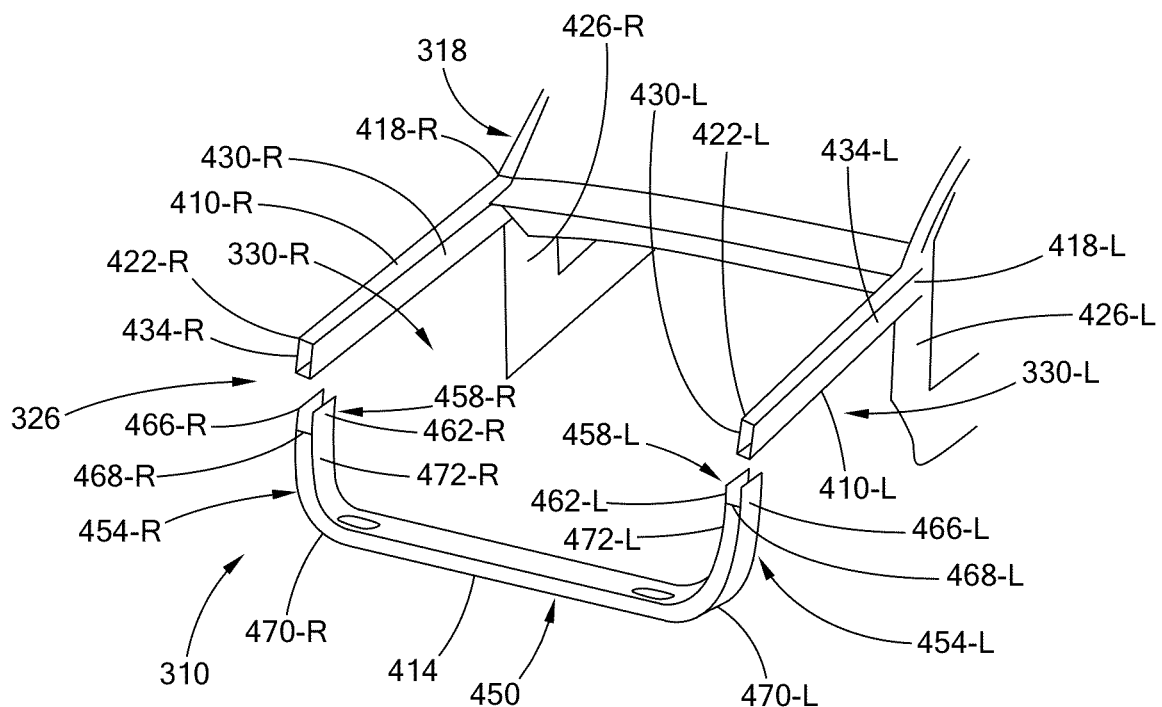
FIG. 4 is an exploded perspective view of the front end structure of the vehicle of FIG. 3.

With additional reference to FIG. 4, the front subframe 326 includes a left upper tube 410-L, a right upper tube 410-R, and a lower support tie bar 414. The left and right upper tubes 410-L, 410-R are also referred to herein as left and right front tubes. Each of the left and right upper tubes 410-L, 410-R is a structural tube that extends from a corresponding rear end 418-L, 418-R to a corresponding forward end 422-L, 422-R. The rear end 418-L, 418-R is connected to (e.g., welded, bolted, or riveted to) a corresponding front hinge pillar 426-L, 426-R of the body 318. The left upper tube 410-L extends in the longitudinal direction of the vehicle proximate a left side of the vehicle 310 generally above a left front wheel well 330-L of the vehicle 310. The right upper tube 410-R extends in the longitudinal direction of the vehicle proximate a right side of the vehicle 310 generally above a right front wheel well 330-R of the vehicle 310.

In the example provided, each of the left and right upper tubes 410-L, 410-R is a single, extruded or roll-formed unitary tube having a generally rectangular hollow cross-sectional shape with a corresponding inboard wall 430-L, 430-R facing in the inboard direction and a corresponding outboard wall 434-L, 430-R facing the outboard direction, though other shapes or constructions can be used. For example, the left and right upper tubes 410-L, 410-R can be rounded, hexagonal, or have a closed profile shape with any number of sides. In one form, the left and right upper tubes 410-L, 410-R are aluminum or steel, though other materials can be used.

In an alternative configuration, not specifically shown, the left and right upper tubes 410-L, 410-R can be formed from a plurality of individual pieces of material welded together. For example, each of the left and right upper tubes 410-L, 410-R can have an inboard piece that defines the inboard wall 430-L, 430-R and is welded to an outboard piece that defines the outboard wall 434-L, 434-R. In one example of such a construction, the inboard and outboard pieces may be sheet metal stamped to have generally hat-shaped cross-sections that cooperate to define a hollow tube when welded together, though other configurations can be used.

Returning to the example shown in FIG. 4, the lower support tie bar 414 includes a lateral portion 450, a left riser portion 454-L, and a right riser portion 454-R. The lateral portion 450 is substantially horizontal and extends longitudinally in the lateral direction of the vehicle 310 between the left and right riser portions 454-L, 454-R. In an alternative configuration, not specifically shown, the lateral portion 450 may have a shape that does not follow a straight path between the left and right riser portions 454-L, 454-L. For example, the lateral portion 450 may have bends to define recessed or plateaued portions between the left and right riser portions 454-L, 454-R and/or to define forward or rearward jutting portions between the left and right riser portions 454-L, 454-R.

Returning to the example provided in FIG. 4, the left and right riser portions 454-L, 454-R extend upward from left and right ends of the lateral portion 450. The upper end of each of the left and right riser portions 454-L, 454-R defines a bracket or flange 458-L, 458-R configured to attach to the corresponding forward end 422-L, 422-R of the left or right upper tube 410-L, 410-R.

In the example provided, the flanges 458-L, 458-R each include an inboard wall 462-L, 462-R and an outboard wall 466-L, 466-R, spaced apart from the inboard wall 462-L, 462-R to define a slot or channel 468-L, 468-R therebetween. The outboard wall 466-L, 466-R is spaced apart from the inboard wall 462-L, 462-R a distance substantially equal to the lateral width of the corresponding left or right upper tube 410-L, 410-R such that the left or right upper tube 410-L, 410-R is received in the corresponding channel 468-L, 468-R, as shown in FIG. 5. The inboard wall 462-L, 462-R is then affixed (e.g., welded, bolted, riveted) to the corresponding inboard wall 430-L, 430-R and the outboard wall 466-L, 466-R is affixed (e.g., welded, bolted, riveted) to the corresponding outboard wall 434-L, 434-R. The flanges 458-L, 458-R are affixed to the left and right upper tubes 410-L, 410-R, respectively, proximate the left and right forward ends 422-L, 422-R.

In the example provided, the lower support tie bar 414 is a single, extruded or roll-formed unitary piece of material having a generally rectangular hollow cross-sectional shape, though other shapes or constructions can be used. In the example provided, the single unitary piece of material such that the bottoms of the left and right riser portions 454-L, 454-R include a bend 470-L, 470-R that curves or smoothly transitions from the ends of the lateral portion 450 to a substantially straight region 472-L, 472-R of the left and right riser portions 454-L, 454-R. In one form, the lower support tie bar 414 is aluminum or steel, though other materials can be used.

Figure 13:
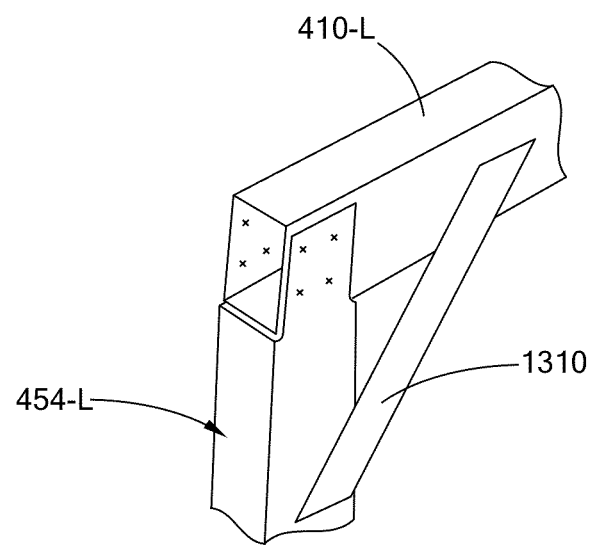
FIG. 13 is a perspective view of a portion of a front end structure of a third configuration in accordance with the teachings of the present disclosure.

With reference to FIGS. 5-7, in the example provided, the left and right riser portions 454-L, 454-R can extend upward and rearward to define an interior angle 474 relative to the left and right upper tubes 410-L, 410-R that is greater than 90 degrees and less than 180 degrees. In an alternative configuration, similar to that shown in FIG. 13, the interior angle 474, can be substantially 90 degrees, i.e., substantially perpendicular.

In one form, the angle 474 and height of the riser portion 454-L, 454-R is such that the riser portion 454-L, 454-R is coupled to the upper tube 410-L, 410-R at a location that is rearward of the lateral portion 450, though other configurations can be used. In one form, the forward end 422-L, 422-R is positioned such that the upper tube 410-L, 410-R does not extend forward of the lateral portion 450, though other configurations can be used. In one form, the lateral portion 450 is forward of the forward ends 422-L, 422-R, though other configurations can be used.

Referring to FIG. 5, the lateral portion 450 extends across and above the left and right main frame rails 314-L, 314-R and may be coupled to the left and right main frame rails 314-L, 314-R. In the example provided, the lateral portion 450 is coupled to the left and right main frame rails 314-L, 314-R by corresponding mounts 510-L, 510-R. Each mount 510-L, 510-R may optionally be configured to permit compliance or slight movement between the lateral portion 450 and the left and right main frame rails 314-L, 314-R.

Figure 9:
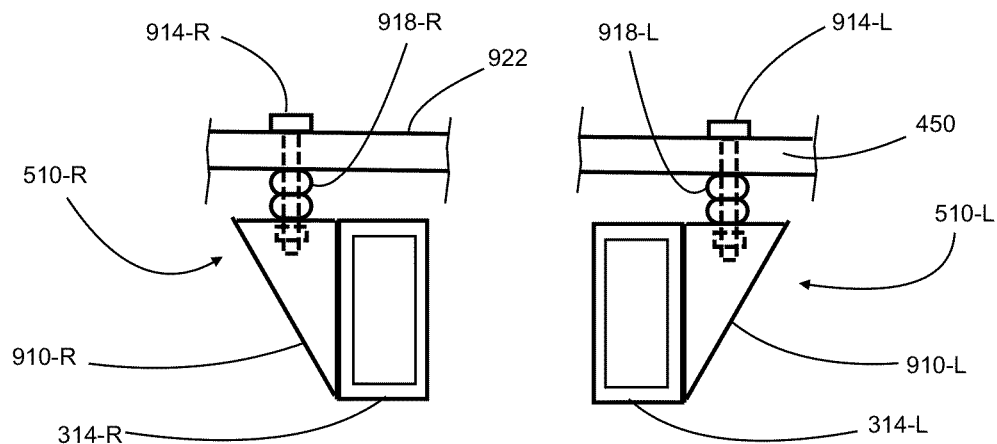
FIG. 9 is a front view of a portion of the frame and front end structure of FIG. 3.

Referring to FIG. 9, in the example provided, each mount 510-L, 510-R includes a bracket 910-L, 910-R, a fastener 914-L, 914-R, and a bushing 918-L, 918-R. The bracket 910-L, 910-R is affixed to the corresponding left or right main frame rail 314-L, 314-R. The fastener 914-L, 914-R may be any suitable type of fastener (e.g., bolt, screw, rivet) and is configured to couple the lateral portion 450 to the brackets 910-L, 910-R. In the example provided, the fastener 914-L, 914-R is a bolt in which its head opposes a top surface 922 of the lateral portion 450 and its shaft extends through an aperture in the lateral portion 450 and an aperture in the bracket 910-L, 910-R and is secured thereto by a nut. In an alternative configuration, the fastener 914-L, 914-R may be a machine screw and the bracket may include a threaded aperture to which the machine screw threadably attaches.

The bushing 918-L, 918-R is positioned between the lateral portion 450 and the bracket 910-L, 910-R or the main frame rails 314-L, 314-R. The bushing 918-L, 918-R is a resilient material, such as rubber or a resilient polymer for example. The bushing 918-L, 918-R may be configured to dampen vibration of the lateral portion 450 relative to the left and right main frame rails 314-L, 314-R. In the example provided, each bushing 918-L, 918-R is disposed about the corresponding fastener 914-L, 914-R, though other configurations can be used.

Returning to FIG. 5, the main frame rails 314-L, 314-R may optionally extend forward of the lateral portion 450 and a bumper 550 (schematically illustrated in dashed lines) may be mounted to the main frame rails 314-L, 314-R forward of the lateral portion 450. While not specifically shown, energy absorbing structures may be disposed between the bumper 550 and the main frame rails 314-L, 314-R.

Figure 8:
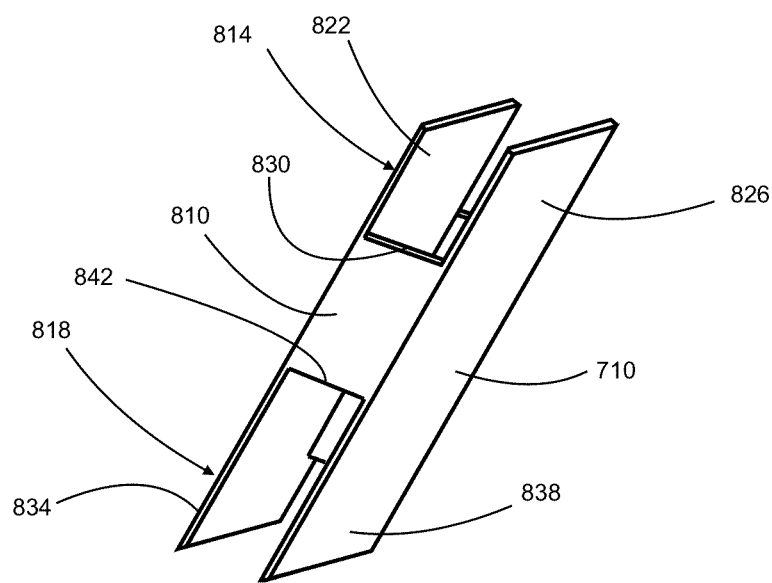
FIG. 8 is a perspective view of the gusset of FIG. 7.

Referring to FIGS. 7 and 8, a corresponding gusset 710 may optionally couple the left and right riser portions 454-L, 454-R to the left and right upper tubes 410-L, 410-R, respectively. Each gusset 710 can include a generally tubular body 810 including an upper flange 814 at an upper end of the body 810 and a lower flange 818 at the lower end of the body 810. The upper flange 814 is configured to couple the gusset 710 to the upper tube 410-L, 410-R and the lower flange 818 is configured to couple the gusset 710 to the riser portion 454-L, 454-R. In the example provided, the body 810 is a tube having a generally rectangular cross-sectional shape, though other configurations can be used.

In the example provided, the upper flange 814 includes an inboard wall 822 and an outboard wall 826, spaced apart from the inboard wall 822 to define a slot or channel 830 therebetween. The outboard wall 826 is spaced apart from the inboard wall 822 a distance substantially equal to the lateral width of the corresponding left or right upper tube 410-L, 410-R such that the left or right upper tube 410-L, 410-R is received in the channel 830. The inboard wall 822 is then affixed (e.g., welded, bolted, riveted) to the corresponding inboard wall 430-L, 430-R (labeled in FIG. 4) and the outboard wall 826 is affixed (e.g., welded, bolted, riveted) to the corresponding outboard wall 434-L, 434-R (labeled in FIG. 4). The upper flange 814 is affixed to the left or right upper tube 410-L, 410-R between the flange 458-L, 458-R (labeled in FIG. 4) and the hinge pillar 426-L, 426-R (labeled in FIG. 4).

In the example provided, the lower flange 818 includes an inboard wall 834 and an outboard wall 838, spaced apart from the inboard wall 834 to define a slot or channel 842 therebetween. The outboard wall 838 is spaced apart from the inboard wall 834 a distance substantially equal to the lateral width of the corresponding left or right upper tube 410-L, 410-R such that the left or right upper tube 410-L, 410-R is received in the channel 842. The inboard wall 834 is then affixed (e.g., welded, bolted, riveted) to the corresponding inboard wall 430-L, 430-R (labeled in FIG. 4) and the outboard wall 838 is affixed (e.g., welded, bolted, riveted) to the corresponding outboard wall 434-L, 434-R (labeled in FIG. 4). The lower flange 818 is affixed to the left or right riser portion 454-L, 454-R between the lateral portion 450 and the flange 458-L, 458-R (labeled in FIG. 4).

While FIGS. 7 and 8 illustrate one configuration of an optional gusset 710, other configurations can be used. For example, referring to FIG. 13, a gusset 1310 of one example alternative configuration is illustrated. The gusset of 1319 is a flat plate that is affixed (e.g., welded, riveted, bolted) to the riser portion 454-L, 454-R at one end and to the upper tube 410-L, 410-R at the opposite end. Any number of the gussets 1310 may be used to reinforce the connection between the riser portion 454-L, 454-R and the upper tube 410-L, 410-R, and the gusset 1310 may be disposed on the outboard sides, the inboard sides or both inboard and outboard sides thereof.

Figure 10:
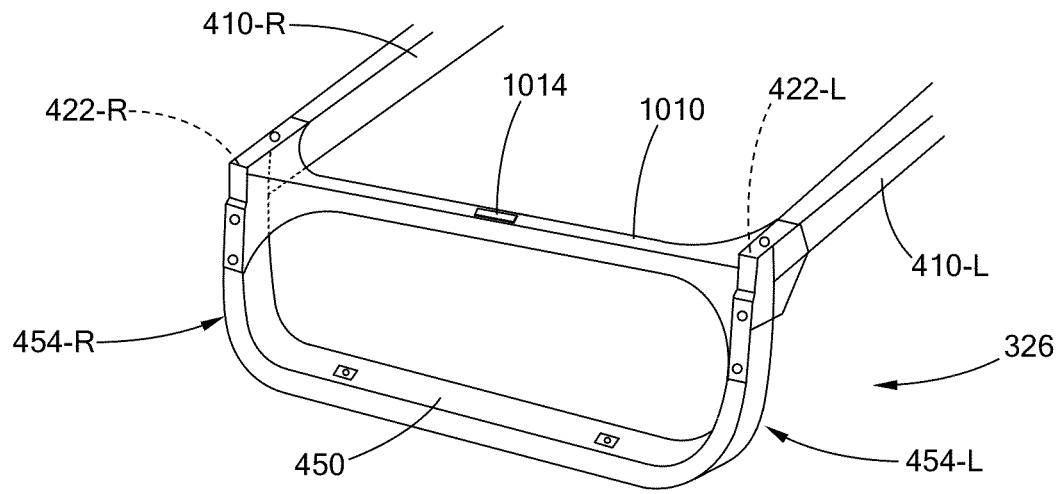
FIG. 10 is a perspective view of the front end structure of FIG. 3, illustrated with an optional upper bolster in accordance with the teachings of the present disclosure.
Figure 11:
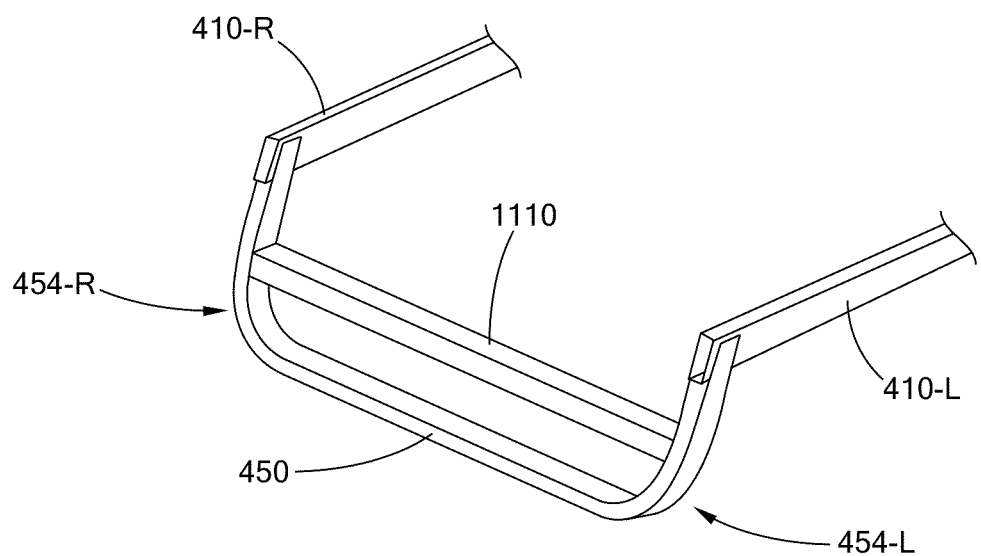
FIG. 11 is a perspective view of the front end structure of FIG. 3, illustrated with an optional upper bolster of a second configuration in accordance with the teachings of the present disclosure.

Referring to FIG. 10, an optional upper bolster 1010 may span between the forward end 422-L of the left upper tube 410-L and the forward end 422-R of the right upper tube 410-R. The upper bolster 1010 may be configured to support one or more vehicle components such as a hood latch 1014 configured to secure a hood (not shown) in a closed position, for example. The upper bolster 1010 may also provide additional stiffness to the front subframe 326. In the example provided, the upper bolster 1010 is attached to the left and right upper tubes 410-L, 410-R and the left and right riser portions 454-L, 454-R, though other configurations may be used. For example, the upper bolster 1010 may be attached to the left and right upper tubes 410-L, 410-R and/or the left and right riser portions 454-L, 454-R above the lateral portion 450. Referring to FIG. 11, one example alternative configuration is illustrated in which an upper bolster 1110 is attached to the left and right riser portions 454-L, 454-R above the lateral portion 450 but not attached directly to the left and right upper tubes 410-L, 410-R.

Figure 12:
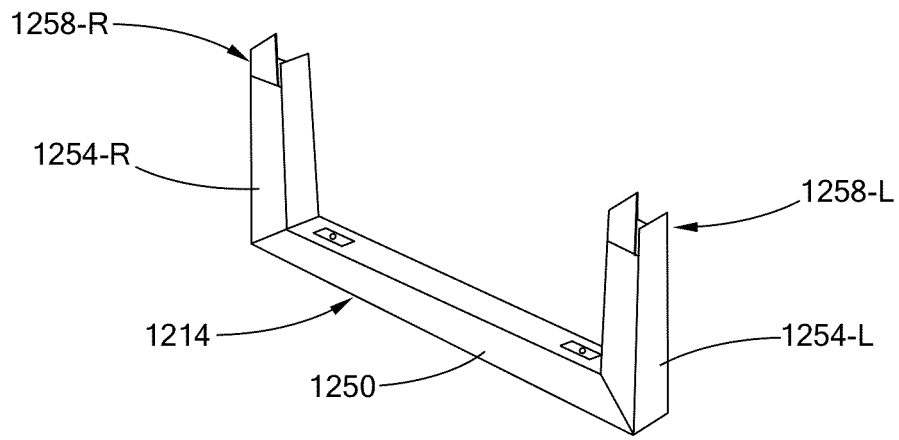
FIG. 12 is a perspective view of a portion of a front end structure of a second configuration in accordance with the teachings of the present disclosure.

Referring to FIG. 12, a lower support tie bar 1214 of one alternative construction is illustrated. The lower support tie bar 1214 can be similar to the lower support tie bar 414 (FIG. 4) except as otherwise shown or described herein. The lower support tie bar 1214 is formed of a plurality of individual pieces welded together. Specifically, the lower support tie bar 1214 includes a lateral portion 1250, a left riser portion 1254-R, and a right riser portion 1254-L, each being a separate piece welded to one another before the entire lower support tie bar 1214 is attached to the left and right upper tubes 410-L, 410-R (FIGS. 4 and 5) in a manner similar to that of the lower support tie bar 414 (FIGS. 4 and 5).

The lateral portion 1250 is similar to the lateral portion 450, except as otherwise shown or described herein. The left and right riser portions 1250-L, 1250-R are similar to the left and right riser portions 450-L, 450-R, respectively, except as otherwise shown or described herein. In the example provided, left and right ends of the lateral portion 1250 are joined to the left and right riser portions 1254-L, 1254-R, respectively, via mitered welded connections, though other configurations can be used.

In the example provided, the left and right riser portions 1254-L, 1254-R extend directly upward vertically and do not angle rearward or have a curved region. In an alternative configuration, not specifically shown, the left and right riser portions 1254-L, 1254-R can extend upward and rearward at an angle, similar to the left and right riser portions 454-L, 454-R (FIGS. 4 and 5). In an alternative configuration, not specifically shown, the left and right riser portions 1254-L, 1254-R can include curved regions similar to the left and right riser portions 454-L, 454-R (FIGS. 4 and 5). The upper ends of the left and right riser portions 1254-L, 1254-R include flanges 1258-L, 1258-R, similar to flanges 458-L, 458-R (FIG. 4).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A body on frame vehicle comprising:
    a left hinge pillar;
    a right hinge pillar;
    a left front tube extending proximate a left side of the body on frame vehicle above a left front wheel well of the body on frame vehicle, the left front tube terminating in a forward direction of the body on frame vehicle at a left forward end and terminating in a rearward direction of the body on frame vehicle at a left rearward end that is attached to the left hinge pillar;
    a right front tube extending proximate a right side of the body on frame vehicle above a right front wheel well of the body on frame vehicle, the right front tube terminating in the forward direction at a right forward end and terminating in the rearward direction at a right rearward end that is attached to the right hinge pillar;
    a lower support including a lateral portion, a left riser portion, and a right riser portion, wherein a left end of the lower support extends upward to transition via a single bend from the lateral portion to the left riser portion and a right end of the lower support extends upward to transition via a single bend from the lateral portion to the right riser portion, wherein the left riser portion is affixed to the left front tube proximate the left forward end and the right riser portion is affixed to the right front tube proximate the right forward end, wherein the left riser portion is connected to the left front tube at a location on the left front tube that is rearward of the lateral portion and the right riser portion is connected to the right front tube at a location on the right front tube that is rearward of the lateral portion, wherein the left riser portion follows a substantially straight path from the left front tube to the single bend of the left end of the lower support, wherein the right riser portion follows a substantially straight path from the right front tube to the single bend of the right end of the lower support;
    a left frame rail, wherein the lateral portion is mounted to a forward end portion of the left frame rail, wherein the left frame rail extends rearward of the left hinge pillar; and
    a right frame rail, wherein the lateral portion is mounted to a forward end portion of the right frame rail, wherein the right frame rail extends rearward of the right hinge pillar,
    wherein the lateral portion extends in a lateral direction of the body on frame vehicle over the left frame rail and the right frame rail.

2. The body on frame vehicle according to claim 1, wherein the left riser portion includes a pair of left flanges that are spaced apart to define a left slot, the left front tube being received in the left slot and connected to the pair of left flanges,
    wherein the right riser portion includes a pair of right flanges that are spaced apart to define a right slot, the right front tube being received in the right slot and connected to the pair of right flanges.

3. The body on frame vehicle according to claim 1, wherein the left front tube includes a pair of left flanges that are spaced apart to define a left slot, the left riser portion being received in the left slot and connected to the pair of left flanges,
    wherein the right front tube includes a pair of right flanges that are spaced apart to define a right slot, the right riser portion being received in the right slot and connected to the pair of right flanges.

4. The body on frame vehicle according to claim 1, wherein the lateral portion is forward of the left forward end of the left front tube and the lateral portion is forward of the right forward end of the right front tube.

5. The body on frame vehicle according to claim 1, wherein the lower support is a singular piece of material.

6. The body on frame vehicle according to claim 1, wherein the left riser portion and the right riser portion are rectangular in cross-sectional shape.

7. The body on frame vehicle according to claim 6, wherein the left front tube and the right front tube are rectangular in cross-sectional shape.

8. The body on frame vehicle according to claim 1, wherein the lower support is extruded aluminum or roll-formed aluminum.

9. The body on frame vehicle according to claim 1 further comprising:
    a left gusset, wherein a forward end of the left gusset is affixed to the left riser portion between the lateral portion and the left front tube, wherein a rearward end of the left gusset is affixed to the left front tube rearward of the left riser portion; and
    a right gusset, wherein a forward end of the right gusset is affixed to the right riser portion between the lateral portion and the right front tube, wherein a rearward end of the right gusset is affixed to the right front tube rearward of the right riser portion.

10. The body on frame vehicle according to claim 1 further comprising an upper bolster disposed above the lateral portion,
    wherein a left end of the upper bolster is attached to:
        the left riser portion, or
        the left front tube proximate the left forward end, or
        both the left riser portion and the left front tube proximate the left forward end,
    wherein a right end of the upper bolster is attached to:
        the right riser portion, or
        the right front tube proximate the right forward end, or
        both the right riser portion and the right front tube proximate the right forward end.

11. The body on frame vehicle according to claim 10, wherein the left end of the upper bolster is attached to the left front tube proximate the left forward end and the right end of the upper bolster is attached to the right front tube proximate the right forward end.

12. The body on frame vehicle according to claim 10, wherein the left end of the upper bolster is attached to the left riser portion and the right end of the upper bolster is attached to the right riser portion.

13. A body on frame vehicle comprising:
    a left hinge pillar;
    a right hinge pillar;
    a front subframe comprising:

a left front tube extending proximate a left side of the body on frame vehicle above a left front wheel well of the body on frame vehicle, the left front tube terminating in a forward direction of the body on frame vehicle at a left forward end and terminating in a rearward direction of the body on frame vehicle at a left rearward end that is attached to the left hinge pillar;

a right front tube extending proximate a right side of the body on frame vehicle above a right front wheel well of the body on frame vehicle, the right front tube terminating in the forward direction at a right forward end and terminating in the rearward direction at a right rearward end that is attached to the right hinge pillar; and a lower support including a lateral portion, a left riser portion, and a right riser portion, wherein a left end of the lower support extends upward via a single bend from the lateral portion to form the left riser portion and a right end of the lower support extends upward via a single bend from the lateral portion to form the right riser portion, wherein the left riser portion is affixed to the left front tube proximate the left forward end and the right riser portion is affixed to the right front tube proximate the right forward end, wherein the left riser portion is connected to the left front tube at a location on the left front tube that is rearward of the lateral portion and the right riser portion is connected to the right front tube at a location on the right front tube that is rearward of the lateral portion, wherein the left riser portion follows a substantially straight path from the left front tube to the single bend at the left end of the lower support, wherein the right riser portion follows a substantially straight path from the right front tube to the single bend at the right end of the lower support;

a left frame rail, wherein the lateral portion is mounted to a forward end portion of the left frame rail, wherein the left frame rail extends rearward of a left hinge pillar of the body on frame vehicle;

a right frame rail, wherein the lateral portion is mounted to a forward end portion of the right frame rail, wherein the right frame rail extends rearward of a right hinge pillar of the body on frame vehicle; and a headlight positioned such that the headlight overlaps in the rearward direction with the lateral portion.

14. The body on frame vehicle according to claim 13, wherein one of the left riser portion and the left front tube includes a pair of left flanges that are spaced apart to define a left slot, and the other one of the left riser portion and the left front tube is received in the left slot and connected to the pair of left flanges, wherein one of the right riser portion and the right front tube includes a pair of right flanges that are spaced apart to define a right slot, and the other one of the right riser portion and the right front tube is received in the right slot and connected to the pair of right flanges.

15. The body on frame vehicle according to claim 13 further comprising:

a left gusset, wherein a forward end of the left gusset is affixed to the left riser portion between the lateral portion and the left front tube, wherein a rearward end of the left gusset is affixed to the left front tube rearward of the left riser portion; and a right gusset, wherein a forward end of the right gusset is affixed to the right riser portion between the lateral portion and the right front tube, wherein a rearward end of the right gusset is affixed to the right front tube rearward of the right riser portion.

16. The body on frame vehicle according to claim 15, wherein the rearward end of the left gusset is affixed to the left front tube forward of the left rearward end of the left front tube, wherein the rearward end of the right gusset is affixed to the right front tube forward of the right rearward end of the right front tube.

17. The body on frame vehicle according to claim 9, wherein the rearward end of the left gusset is affixed to the left front tube forward of the left rearward end of the left front tube, wherein the rearward end of the right gusset is affixed to the right front tube forward of the right rearward end of the right front tube.

18. The body on frame vehicle according to claim 1, further comprising:

a headlight positioned such that the headlight overlaps in the rearward direction with the lateral portion.

19. A body on frame vehicle comprising:

a left hinge pillar;

a right hinge pillar;

a left front tube extending proximate a left side of the body on frame vehicle above a left front wheel well of the body on frame vehicle, the left front tube terminating in a forward direction of the body on frame vehicle at a left forward end and terminating in a rearward direction of the body on frame vehicle at a left rearward end that is attached to the left hinge pillar;

a right front tube extending proximate a right side of the body on frame vehicle above a right front wheel well of the body on frame vehicle, the right front tube terminating in the forward direction at a right forward end and terminating in the rearward direction at a right rearward end that is attached to the right hinge pillar;

a lower support including a lateral portion, a left riser portion, and a right riser portion, wherein a left end of the lower support extends upward from the lateral portion to form the left riser portion and a right end of the lower support extends upward from the lateral portion to form the right riser portion, wherein the left riser portion is affixed to the left front tube proximate the left forward end and the right riser portion is affixed to the right front tube proximate the right forward end, wherein the left riser portion is connected to the left front tube at a location on the left front tube that is rearward of the lateral portion and the right riser portion is connected to the right front tube at a location on the right front tube that is rearward of the lateral portion;

a left gusset, wherein a forward end of the left gusset defines a left lower slot and a rearward end of the left gusset defines a left upper slot, wherein the left riser portion is received in the left lower slot and the left front tube is received in the left upper slot;

a right gusset, wherein a forward end of the right gusset defines a right lower slot and a rearward end of the right gusset defines a right upper slot, wherein the right riser portion is received in the right lower slot and the right front tube is received in the right upper slot;

a left frame rail, wherein the lateral portion is mounted to a forward end portion of the left frame rail, wherein the left frame rail extends rearward of the left hinge pillar; and a right frame rail, wherein the lateral portion is mounted to a forward end portion of the right frame rail, wherein the right frame rail extends rearward of the right hinge pillar.

20. The body on frame vehicle of claim 1, wherein the left front tube follows a substantially straight path from the left hinge pillar to the left forward end, and the right front tube follows a substantially straight path from the right hinge pillar to the right forward end.

\* \* \* \* \*